UNITED STATES PATENT OFFICE.

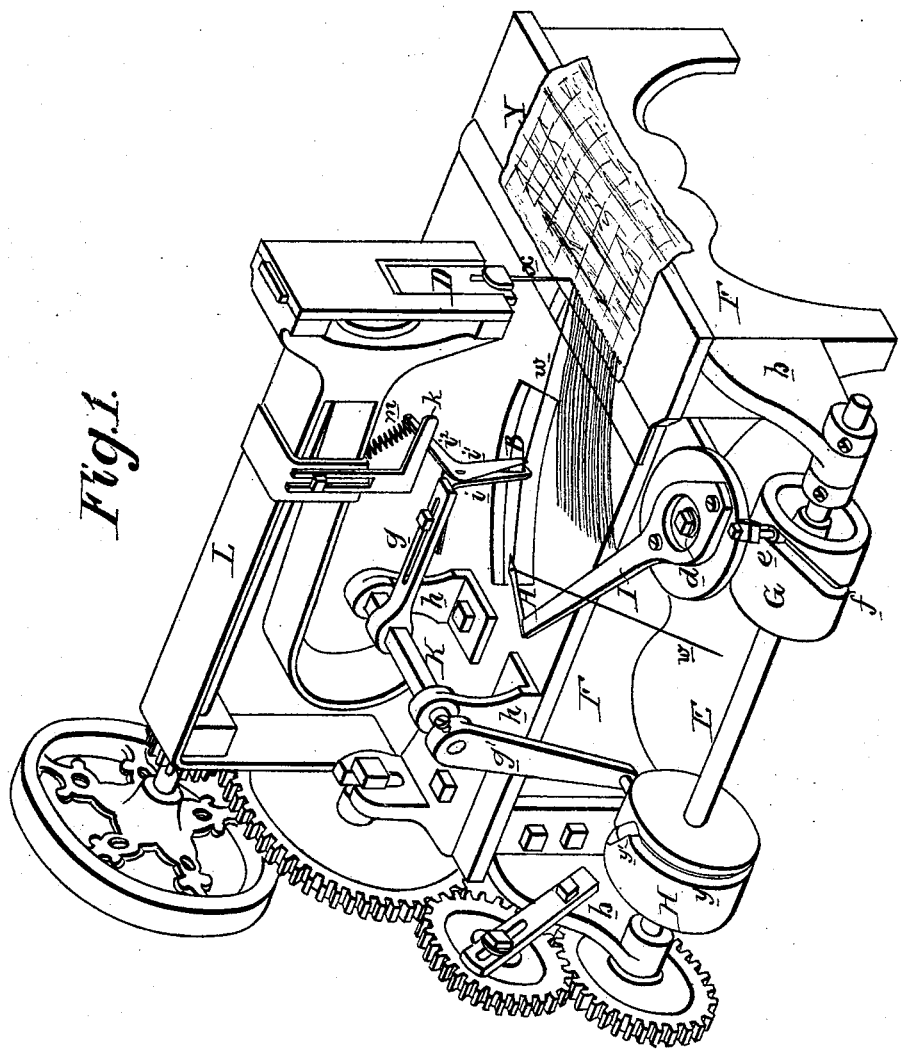

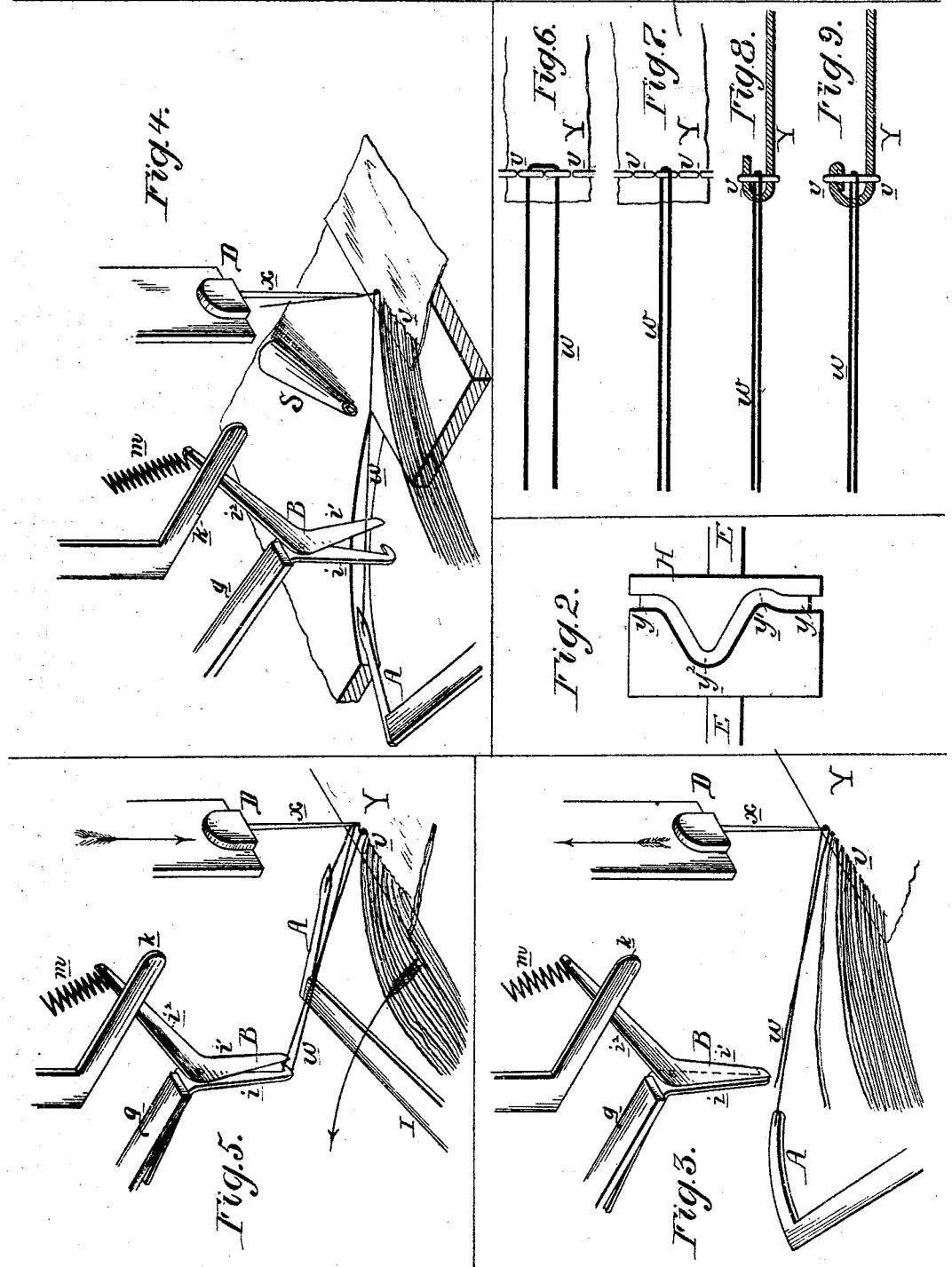

WILLIAM H. WRIGHT, OF CHESTER, PENNSYLVANIA.

IMPROVEMENT IN FRINGING-MACHINES.

Specification forming part of Letters Patent No. 146,970, dated January 27, 1874; application filed December 16, 1873.

*To all whom it may concern:*

Be it known that I, WILLIAM HENRY WRIGHT, formerly of Bradford, Yorkshire, England, but now residing at Chester, Delaware county, Pennsylvania, have invented a Fringing-Machine, of which the following is a specification:

The object of my invention is to automatically make and attach a fringe to the edge of a shawl or other garment, by the machine illustrated in the perspective view, Fig. 1, Sheet 1, of the accompanying drawing, in which a needle or looper, A, and a loop retaining and releasing device or cutter, B, are combined, and operate in conjunction with sewing mechanism, D, in the manner fully described hereafter, so as to form, with a thread, $w$, a series of long loops, constituting a fringe, and to stitch the latter to the edge of a shawl or other garment.

My invention is illustrated, in the present instance, as applied to an ordinary Singer sewing-machine, of the kind used for heavy work, there being a needle, $x$, above the work-plate, and a shuttle beneath the latter, which operate in conjunction, as usual, to produce a lock-stitch.

A shaft, E, turns in suitable bearings $b\ b$ on the frame F of the sewing-machine, and is operated from the driving-shaft of the latter, through any suitable system of gearing, by which it is caused to turn at exactly one-half the speed of the said driving-shaft. There are two cams, G and H, on the shaft E, the former of which operates the looping-needle A, and the latter the shears B. The needle A is carried by a horizontal arm or lever, I, having its fulcrum at $d$ on the fixed frame, and a pin and anti-friction roller, $e$, which enter the groove $f$ of the cam G, an oscillating movement from and toward the sewing-machine needle $x$ being thus imparted to the said arm I and looping-needle. The shears B are situated directly over a portion of the curved path of the looping-needle A, and are secured to the arm $g$ of a rock-shaft, K, which turns in bearings $h$, secured to the bed-plate of the machine, a second arm, $g'$, on the said shaft entering the groove of the cam H.

The shears consist of two blades, $i$ and $i^1$, the former of which is fixed to the arm G, and is hooked at its lower end, while the latter is pivoted to the fixed blade, and has an arm, $i^2$, which extends beneath a fixed projection, $k$, of the sewing-machine arm L, and is maintained in contact therewith by a spring, $m$. The character of the groove in the cam H (see Fig. 2, Sheet 2) is such that when the arm $g'$ is traversing the plain portion $y$ of the said groove, the shears B are partly closed by the contact of the arm $i^2$ with the projection $k$, as shown in Fig. 1, while the said shears will be elevated to their full extent, and entirely closed, as shown in the detached view, Fig. 3, Sheet 2. When the operating arm has entered the portion $y^1$ of the said groove, and when the portion $y^2$ of the groove has been reached, the shears will be lowered in the path of the looping-needle, and will be fully opened, as shown in the detached view, Fig. 4, Sheet 2. The combined mechanism is so timed that the needle $x$ shall descend twice during each complete movement of the looping-needle A and shears B; and the operation of the machine is as follows:

The fringing-thread $w$ is supplied from a bobbin or bobbins, arranged at any convenient point adjacent to the machine, and is passed through the eye of the looping-needle A, and the shawl or other garment Y is so adjusted to the sewing-machine that a line of stitching, $v$, shall be formed upon it adjacent to and parallel with its edge, the direction of the feed being indicated by the arrow 1, Fig. 1. The looping-needle A advances toward and carries its thread beneath the needle $x$, and is then retracted so as to form a loop, through which the said needle $x$ passes in its descent, thus holding the thread and preventing it from being drawn away by the looper. The latter continues its rearward movement until it has reached the position shown in Fig. 1, and during this movement the shears B are opened to their full extent and descend over the fringing-thread, as shown in Fig. 4, and are then slightly raised and partially closed, so as to retain the said fringing-thread between their blades, as seen in Fig. 1. The needle $x$, which has been raised during the rearward movement of the looper, now descends a second time, in order to complete a stitch, with which the fringing-thread is interlocked, and the needle A again advances, loops its thread a second time around the needle $x$, and then commences another rearward movement. The parts are now in the position illustrated in the detached perspective view, Fig. 5, and a long loop of fringing-thread is stitched to the edge of the shawl Y, and held by the shears B. These shears, when the looper has reached the position shown in Fig. 3, close upon and cut this loop, which is thus released, and the shears are then immediately opened and descend, as before described, and as shown in Fig. 4, in order to again seize the thread drawn beneath them by the looper.

A succession of long loops are thus formed by the needle A and shears, and are successively cut by the latter after having been stitched to the edge of the shawl. The cut threads constitute a fringe which must necessarily be uniform, as its length is determined by the distance between the needle $x$ and shears. The cut loops, if permitted to remain beneath the shears, might become entangled with the thread attached to the looper, and interfere with the operation of the machine, but for a blow-pipe, S, Fig. 4, a slight blast from which, induced by a rotary fan or otherwise, blows the fringe to one side and out of the way, as shown.

The method of interlocking the fringing-threads $w$ with the stitches $v$ is illustrated in the diagrams, Figs. 6 and 7, Sheet 2, but the interlocking can be variously modified, and will depend somewhat on the character of sewing-machine with which my invention is combined.

The diagrams, Figs. 8 and 9, represent modifications, in which the fringing-thread is carried through the fabric and interlocked with the stitches $v$ within a hem. For a single thread or chain-stitch machine, the method of interlocking might differ from all of the above.

To form the complete stitch, illustrated in Figs. 8 and 9, the looper A would have to be in the form of a sharp-pointed needle, but a blunt looper, such as that illustrated in Fig. 3, would suffice for the stitches shown in Figs. 6 and 7.

For some classes of fringe it may be desirable to leave the loops uncut. In such case the shears would have to be dispensed with, and a double-bladed loop retaining and releasing device, operating in nearly the same manner as the shears, would be substituted for the same.

I claim as my invention—

1. In a fringing-machine, the combination, substantially as described, of a sewing mechanism, D, a needle or looper, A, and a loop retaining and releasing device or shears, B, consisting of two pivoted blades, $i$ and $i^1$.

2. The combination of a blower, S, with the within-described fringing mechanism, for the purpose specified.

In testimony whereof I have signed my name to this specification in the presence of two subscribing witnesses.

WM. H. WRIGHT.

Witnesses:
WM. A. STEEL,
J. SHERBORNE SINGER.